(12) United States Patent
Zhang et al.

(10) Patent No.: US 12,211,083 B2
(45) Date of Patent: Jan. 28, 2025

(54) SYSTEM AND METHOD FOR VALIDATING PRODUCT PHOTOGRAPHY

(71) Applicant: Beijing Wodong Tianjun Information Technology Co., Ltd., Beijing (CN)

(72) Inventors: Chi Zhang, Fremont, CA (US); Xiaochuan Fan, Milpitas, CA (US); Yong Yang, Mountain View, CA (US); Xincheng Wang, Mountain View, CA (US); Shiliang Diao, Mountain View, CA (US); Lingfei Wu, Armonk, NY (US); Yun Xiao, Cupertino, CA (US)

(73) Assignee: BEIJING WODONG TIANJUN INFORMATION TECHNOLOGY CO., LTD., Beijing (CN)

( * ) Notice: Subject to any disclaimer, the term of this patent is extended or adjusted under 35 U.S.C. 154(b) by 446 days.

(21) Appl. No.: 17/590,210

(22) Filed: Feb. 1, 2022

(65) Prior Publication Data
US 2023/0245208 A1 Aug. 3, 2023

(51) Int. Cl.
*G06Q 30/06* (2023.01)
*G06Q 30/0601* (2023.01)
(Continued)

(52) U.S. Cl.
CPC ........... *G06Q 30/0631* (2013.01); *G06T 5/73* (2024.01); *G06T 7/194* (2017.01); *G06T 7/90* (2017.01);
(Continued)

(58) Field of Classification Search
CPC .. G06Q 30/0631; G06Q 30/0643; G06T 5/73; G06T 7/194; G06T 7/90;
(Continued)

(56) References Cited

U.S. PATENT DOCUMENTS 11,398,089 B1* 7/2022 Jindal .................... G06V 10/82
11,532,147 B2* 12/2022 Barkan ............... G06F 18/2113
(Continued)

OTHER PUBLICATIONS

Inam Ullah, Muwei Jian, et al., A brief survey of visual saliency detection, Multimedia Tools and Applications, 2020, 79:34605-34645.
(Continued)

*Primary Examiner* — Edward F Urban
*Assistant Examiner* — Jongbong Nah
(74) *Attorney, Agent, or Firm* — Scully, Scott, Murphy & Presser, P.C.

(57) ABSTRACT

A method for recommending a product, includes: providing product information having a product description, a main image, and a plurality of alternate images; for each alternate image: performing saliency segmentation to obtain a segment and a background, defining a segment bounding box enclosing the segment, extracting image feature from the segment bounding box, extracting textual feature from the product description, extracting main image feature from the main image, matching the image feature of the segment bounding box to the textual feature and the main image feature, and determining the alternate image as a qualified alternate image if the image feature of the segment bounding box matches the textual feature and the main image feature; and when a number of the qualified alternate image equals to or is greater than a threshold number, recommending the product to customers.

18 Claims, 9 Drawing Sheets

(51) Int. Cl.
   *G06T 5/00*     (2024.01)
   *G06T 5/73*     (2024.01)
   *G06T 7/194*    (2017.01)
   *G06T 7/90*     (2017.01)
   *G06V 30/10*    (2022.01)
   *G06V 30/148*   (2022.01)

(52) U.S. Cl.
   CPC ............ *G06V 30/10* (2022.01); *G06V 30/148*
                   (2022.01); *G06T 2207/20112* (2013.01)

(58) Field of Classification Search
   CPC .......... G06T 2207/20112; G06V 30/10; G06V
                   30/148; G06V 10/25; G06V 10/26; G06V
                   10/454; G06V 10/56; G06V 10/82
   See application file for complete search history.

(56) References Cited

U.S. PATENT DOCUMENTS

| | | | |
|---|---|---|---|
| 2019/0220694 A1* | 7/2019 | Biswas | G06N 3/08 |
| 2021/0248748 A1* | 8/2021 | Turgutlu | G06V 10/774 |
| 2022/0375223 A1* | 11/2022 | Meng | G06F 40/20 |
| 2022/0383032 A1* | 12/2022 | Garg | G06T 7/11 |

OTHER PUBLICATIONS

Kaiming He, Xianyu Zhang, et al., Deep residual learning for image recognition, Proceedings of the IEEE conference on computer vision and pattern recognition, 2016, 770-778.

Yan Chai Hum, Khim Wee Lai, and Maheza Irna Mohamad Salim, Multiobjectives bihistogram equalization for image contrast enhancement, Complexity, 2014.

* cited by examiner

SYSTEM AND METHOD FOR VALIDATING PRODUCT PHOTOGRAPHY

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to e-commerce, and more particularly to systems and methods for automatically validating product photograph so as to provide recommended products that pass the validation criteria.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an e-commerce platform, a seller may provide multiple photos for a product to be sold on the e-commerce platform. Product photography is one of the key factors that drive conversions in e-commerce, where the quality, view angles, colors, and design template of the photos are important to convey information of the product to customers. To ensure high quality of the product photos, the e-commerce platform may employ humans to check and validate every uploaded photo of the product. The process is slow and inaccurate.

Therefore, an unaddressed need exists in the art to address the aforementioned deficiencies and inadequacies.

SUMMARY

In certain aspects, the present disclosure provides methods and apparatus to automatically extract useful information from product photography, cross validate among text descriptions, numerical attributes and other images, and enhance key factors in e-commerce evaluation metrics. The effect achieved by certain embodiments of the present disclosure includes: (1) automatic extraction of products' color and texture from a given image and validation of the image with its text description and numerical attributes; (2) automatic extraction of products' color and texture from a given image and validation of the image with the other images in the same stock keeping unit (SKU); (3) automatic extraction of salience objects, evaluation of object layout and comparison of the image with different design templates; and (4) automatic enhancement of image quality, such as image contrast, brightness and sharpness.

In certain aspects, the present disclosure relates to a method for recommending a product. In certain embodiments, the method is executed by a computing device, and the method includes:

providing product information, where the product information includes a product description, a main image, and multiple alternate images;

extracting textual feature from the product description, and extracting main image feature from the main image;

for each of the multiple alternate images: extracting image feature from the alternate image, matching the image feature to the textual feature and the main image feature, and determining the alternate image as a qualified alternate image if the image feature matches the textual feature and the main image feature; and when a number of the qualified alternate images equals to or is greater than a threshold number: recommending the product with updated product information to customers. The updated product information includes the product description, the main image, and the threshold number of the recommendation alternate images.

In certain embodiments, the step of extracting the image feature includes: performing saliency segmentation to obtain a mask for the alternate image, the mask having a segment and background, saliency values of the segment are greater than saliency values of the background; defining a segment bounding box enclosing the segment; and extracting the image feature from the segment bounding box.

In certain embodiments, average saliency values of the threshold number of the recommendation alternate images are greater than average saliency values of the rest of the number of the qualified alternate images.

In certain embodiments, the method further includes, before extracting the image feature from the segment bounding box: refining the segment in the segment bounding box to obtain refined segment bounding box; and enhancing image quality of the refined segment bounding box to obtain enhanced segment bounding box. The step of extracting the image feature is performed using the enhanced segment bounding box, and the qualified image is derived from the enhanced segment bounding box.

In certain embodiments, the step of refining the segment in the segment bounding box includes:

removing outlier pixels from the segment;

normalizing saliency values of the pixels of the segment to obtain normalized saliency values in a range of 0 to 1;

applying an adaptive threshold to the normalized saliency values to define background and foreground pixels;

forcing saliency values for pixels in contour of the segment to 1; and dropping saliency values around edge of the contour smoothly to 0.

In certain embodiments, the step of removing outlier pixels from the segment is performed using erosion and dilation. In certain embodiments the step of applying an adaptive threshold is performed by comparing a pixel's saliency value with its neighboring pixels' mean or median saliency value. When the pixel's saliency value is less than the mean or median, the pixel is defined as a background pixel. Otherwise, the pixel is defined as a foreground pixel. In certain embodiments, a k pixel×k pixel box is defined for the pixel, where the k is an odd number. The pixel is in the center of the pixel box and the rest of the pixels in the k pixel×k pixel box are the neighboring pixels. In certain embodiments, k is 3, 5, 7, 9, or an odd number greater than 9. In one embodiment, k is 3.

In certain embodiments, the normalized saliency value can also be in a range of 0 to 255.

In certain embodiments, the step of enhancing image quality of the refined segment bounding box includes performing image sharpening and adaptive image histogram equalization on the refined segment bounding box.

In certain embodiments, the segment of the alternate image includes multiple segments, and the method further includes, before extracting the image feature from the segment bounding box:

calculating a 0 degree image moment for each of the multiple segment bounding boxes;

deleting a small segment bounding box from the multiple segment bounding boxes and retain a large segment bounding box, wherein the 0 degree image moment of the small segment bounding box is less than a 0 degree image moment threshold, and the 0 degree image moment of the large segment bounding box equals to or is greater than the 0 degree image moment threshold; and when the number of the large segment bounding box is more than one: calculating an average saliency value for each of the large segment bounding boxes, and selecting the large segment bounding box having the highest average saliency value as the segment bounding box for extracting the image feature.

In certain embodiments, the 0 degree image moment threshold is 10% of an area of the alternate image.

In certain embodiments, the step of extracting the image feature from the segment bounding box is performed by: extracting general image feature from the segment bounding box using a convolutional network; extracting color histogram from the segment bounding box; extracting top-k colors from the color histogram; and combining the genera image feature and the top-k colors to form the image feature.

In certain embodiments, the step of extracting top-k colors is performed using k-means clustering. In certain embodiments, k is three.

In certain embodiments, the step of determining the alternate image as a qualified alternate image includes matching the image feature to the textual feature using a transformer; and matching the image feature to the main image feature using cosine similarity.

In certain embodiments, the threshold number is two.

In certain aspects, the present disclosure relates to a system for recommending a product. In certain embodiments, the system includes a computing device. The computing device has a processor and a storage device storing computer executable code, and the computer executable code, when executed at the processor, is configured to:

provide product information, where the product information includes a product description, a main image, and multiple of alternate images;

extract textual feature from the product description, and extract main image feature from the main image;

for each of the multiple alternate images: extract image feature from the alternate image; match the image feature to the textual feature and the main image feature; and determine the alternate image as a qualified alternate image if the image feature matches the textual feature and the main image feature; and when a number of the qualified alternate image equals to or is greater than a threshold number: recommend the product with the updated product information to customers. The updated product information includes the product description, the main image, and the threshold number of the qualified alternate images.

In certain embodiments, the computer executable code is configured to extract the image feature by: performing saliency segmentation to obtain a mask for the alternate image, the mask having a segment and background, saliency values of the segment are greater than saliency values of the background; defining a segment bounding box enclosing the segment; and extracting the image feature from the segment bounding box.

In certain embodiments, average saliency values of the threshold number of the recommendation alternate images are greater than average saliency values of the rest of the number of the qualified alternate images.

In certain embodiments, the computer executable code is further configured to, before extract image feature from the segment bounding box: refine the segment in the segment bounding box to obtain refined segment bounding box; and enhance image quality of the refined segment bounding box to obtain enhanced segment bounding box. The computer executable code is configured to extract the image feature from the enhanced bounding box, and the qualified image is derived from the enhanced segment bounding box.

In certain embodiments, the computer executable code is configured to refine the segment in the segment bounding box by:

removing outlier pixels from the segment;

normalizing saliency values of the pixels of the segment to obtain normalized saliency values in a range of 0 to 1;

applying an adaptive threshold to the normalized saliency values to define background and foreground pixels;

forcing saliency values for pixels in contour of the segment to 1; and dropping saliency values around edge of the contour smoothly to 0.

In certain embodiments, compute executable code is configured to enhance image quality of the refined segment bounding box by performing image sharpening and adaptive image histogram equalization on the refined segment bounding box.

In certain embodiments, the segment of the alternate image includes multiple segments, and the computer executable code is further configured to:

calculate a 0 degree image moment for each of the multiple segment bounding boxes;

delete a small segment bounding box from the multiple segment bounding boxes and retain a large segment bounding box, wherein the 0 degree image moment of the small segment bounding box is less than a 0 degree image moment threshold, and the 0 degree image moment of the large segment bounding box equals to or is greater than the 0 degree image moment threshold; and when the number of the large segment bounding box is more than one: calculate an average saliency value for each of the large segment bounding boxes, and select the large segment bounding box having the highest average saliency value as the segment bounding box for extracting the image feature.

In certain embodiments, the 0 degree image moment threshold is 10% of an area of the alternate image.

In certain embodiments, the computer executable code is configured to extract the image feature from the segment bounding box by: extracting general image feature from the segment bounding box using a convolutional network; extracting color histogram from the segment bounding box; extracting top-k colors from the color histogram; and combining the genera image feature and the top-k colors to form the image feature.

In certain embodiments, the computer executable code is configured to extract top-k colors using k-means clustering. In certain embodiments, k is three.

In certain embodiments, the computer executable code is configured to determine the alternate image as a qualified alternate image by: matching the image feature to the textual feature using a transformer; and matching the image feature to the main image feature using cosine similarity.

In certain embodiments, the threshold number is two.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
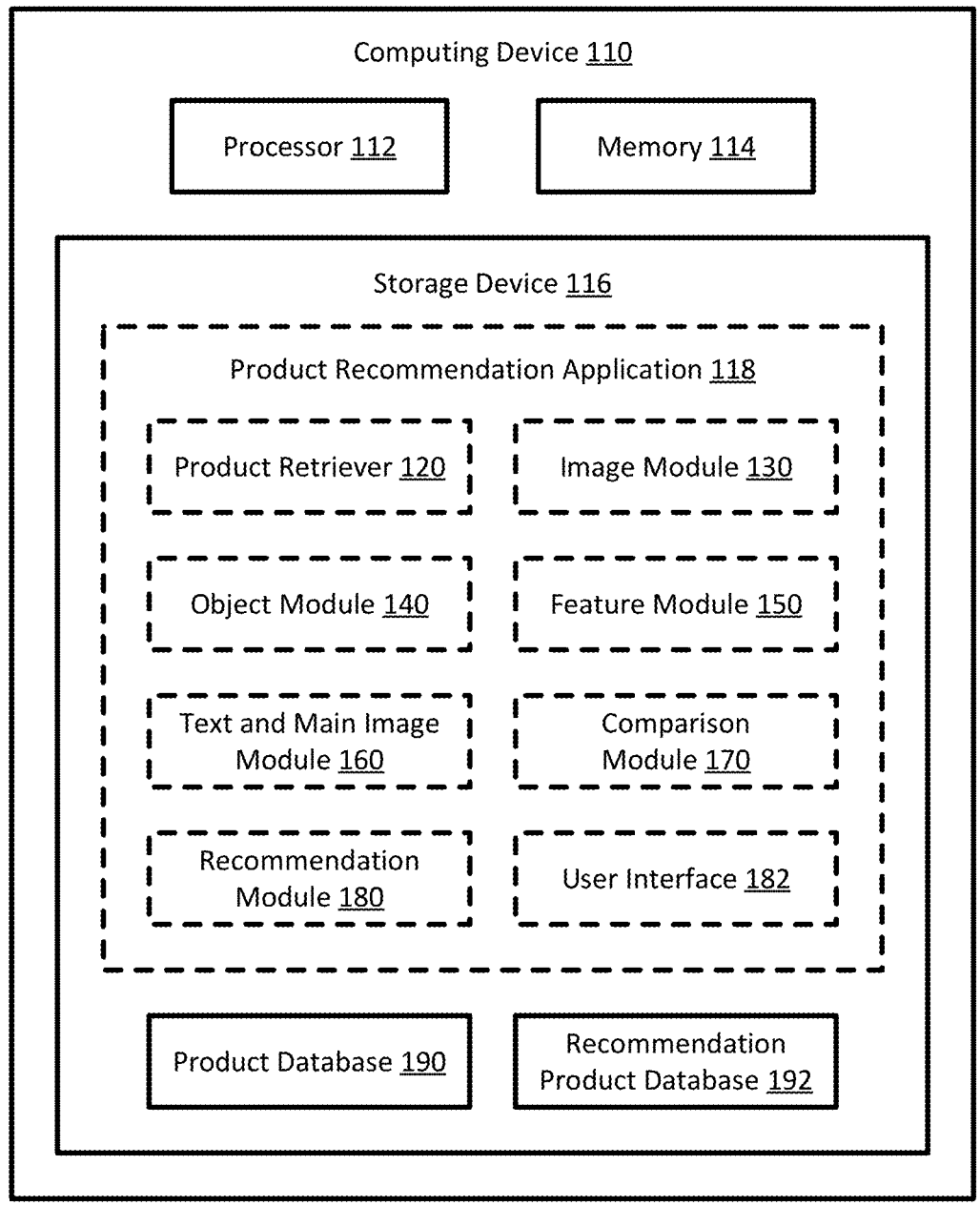
FIG. 1 schematically depicts a product recommendation system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. As used herein, "plurality" means two or more. As used herein, the terms "comprising", "including", "carrying", "having", "containing", "involving", and the like are to be understood to be open-ended, i.e., to mean including but not limited to.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof. The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Image information extraction and analysis, such as classification and detection, are available in the related art. However, most of them are applied for wild images, not for commercial images; and they only focus on a single topic, not combined ones. There are no existing solutions to finish the whole pipeline for such specific tasks for e-commerce, from saliency segmentation, instanced based feature extraction, layout examination, cross-domain validation and quality enhancement. Machine vision methods, such as classification, detection and segmentations in the related art only focus on current image. Comparison with other image features is missing.

In certain aspects of the present disclosure, an e-commerce platform of the present disclosure requires that images or pictures from the same SKU only include a product with the same color and the same type. Product images from different view angles, different light conditions, different backgrounds, different zoom ratios, or with/without post processing, or with only detailed views of part of the products make this task even more challenging. Detailed view of the same product with different view angle, light conditions, and zoom ratio can create larger feature difference than different type of product or same type of product with different colors in same view angle, same light condition and same zoom ratio. Common topics in machine vision field, such as finding the duplication images in the related art fails in these cases.

On the other hand, text feature analysis in natural language processing (NLP) field is only conducted in text description. Relevance between query and title descriptions is a common use in the related art. Communications among images, numerical attributes, and text descriptions all together are missing. In certain aspects, in order to automatically exam whether an image is consistence with its descriptions and its listed attributes, the present disclosure provides cross-domain relevance calculation.

Image segmentations in the related art can be categorized into two classes. The First one is to segment a known object instance, such as human, vehicle, and bike. Collections of labeled data of these object instances must be provided first. A trained neural network cannot segment a new type of instances. The second one is salience detection and segmentation. This method tries to approximate human perception method and generate a saliency map of an image. Such a method can segment unknown type of instances from training data. But the accuracy remains unacceptable for commercial use. Besides that, it usually deals with wild images, not artificial commercial images. In certain aspects, the present disclosure provides accurate object perception based on saliency map, and the object perception is suitable for artificial commercial images.

Image enhancement in the related art could only handle a whole image. It has no capabilities for instance segmented images. In certain aspects, the present disclosure treats each segmented instance separately, and takes the relationship among different segmentation instances into consideration, from a perspective of commercial compliance template.

The present disclosure is advantageous over related art. In certain embodiments, the advantages of the present disclosure include: (1) Iterative segmentation process is provided to segment product image to reach a required precision. A finetuned saliency detection/segmentation neural network from e-commerce images is first applied to photography. Normalization and adaptive thresholding are applied on the saliency map afterwards. Quality enhancement, subpixel smooth, and noise removal are developed to further improve and enhance the image quality region by region. The segmented and enhanced image can finally reach the high standard in e-commerce. (2) Both generalized image feature and artificial feature are extracted for each segmented instance/region within the image. Less saliency instances/objects are automatically removed accordingly. By analysis of the layout and the relationship of each segment part, aesthetics and other high-level features are summarized and extracted. Via the combining layer, multimodality features, such as numerical attribute feature and texture features, are joined with image feature to validate and exam the image information from multiple domains. Feature conflict, for instance, attribute denotes the product as blue but image feature indicates the product is green, is used to evaluate whether the product information may contain error. Improper images, images with wrong labeled attributes or text descriptions, images conflicting with the rest images from the same SKU, can be automatically rejected without human interference.

FIG. 1 schematically depicts a product recommendation system according to certain embodiments of the present disclosure. As shown in FIG. 1, the system 100 includes a computing device 110. In certain embodiments, the computing device 110 may be a server computer, a cluster, a cloud computer, a general-purpose computer, or a specialized computer, which provides product recommendation service. In certain embodiments, the computing device 110 may communicate with other computing devices or services, so as to obtain and provide product information. The product information may include text and images. The text may include title and description of the products, and the images may include main image and alternate images of the products. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a product recommendation application 118, a product database 190, and a recommendation product database 192. The product recommendation application 118 is configured to determine high quality products and recommend the high quality products to customers. The product database 190 includes information of products or stock keeping units (SKUs) of an e-commerce platform. The information of a product may include title, description, main image, and alternate images of the product. The number of alternate images can be, for example, about 5 to 10. The recommendation product database 192 includes information of products that the system plans to recommend to customers. The information of the product for recommendation may include title, description, main image, and a predetermined number of enhanced alternate images of the product. The predetermined number can be, for example, one to three. In one example, the predetermined number is two. In certain embodiments, the product database 190 and the recommendation product database 192 may also be stored in a remote computing device in communication with the computing device 110, as long as the databases are accessible to the product recommendation application 118.

The product recommendation application 118 includes, among other things, a product retriever 120, an image module 130, an object module 140, a feature module 150, a text and main image module 160, a comparison module 170, a recommendation module 180, and a user interface 182. In certain embodiments, the product recommendation application 118 may include other applications or modules necessary for its operation. It should be noted that the modules are each implemented by computer executable codes or instructions, or data table or databases, which collectively forms one application. In certain embodiments, each of the modules may further include sub-modules. Alternatively, some of the modules may be combined as one stack. In certain embodiments, certain modules may be implemented as a circuit instead of executable code. In certain embodiments, some or all of the modules of the product recommendation application 118 may be located at a remote computing device or distributed in a cloud.

The product retriever 120 is configured to retrieve information of a product from the product database 190, and provide the product information to the image module 130 and the text and main image module 160. The product information may include, for example, text of title and description, main image, and alternate images. The image retriever 120 is configured to send the alternate images to the image module 130, and send the text and the main image to the text and main image module 160. The alternate images may be sent one by one or be sent as a batch. The number of alternate images may vary from one product to another product. The number of alternate images may be, for example, 2 to 20. In certain embodiments, the number of alternate image is 5 to 10. In certain embodiments, the number of alternate images is about 7 or 8. In certain embodiments, the product retriever 120 may be configured to retrieve the information of the products from the product database 190 one product by one product, such that all the products in the product database 190 are subjected to the analysis by the product recommendation application 118. In certain embodiments, the product database 190 may be analyzed by the product recommendation application 118 in a scheduled timeline, such as every 24 hours or every week. Under this situation, the product retriever 120 may record the products that have been analyzed previously, and only provide information of newly stored products in the product database 190 to the image module 130 and the text and main image module 160. The size of the main image and the alternate images may be the same. In certain embodiments, when the sizes of the main image and the alternate images are not the same, the product retriever 120 may further be configured to resize the alternate images to the size of the main image. In certain embodiments, the aspect ratio of the alternate images are kept the same during resizing, and white background may be added such that the main image and the resized alternate image have the same pixel size both in the horizontal direction and the vertical direction. The disclosure uses the size of 500 pixels×500 pixels for both the main image and the alternate images in the following description, but the sizes are not limited thereto.

Figure 2:
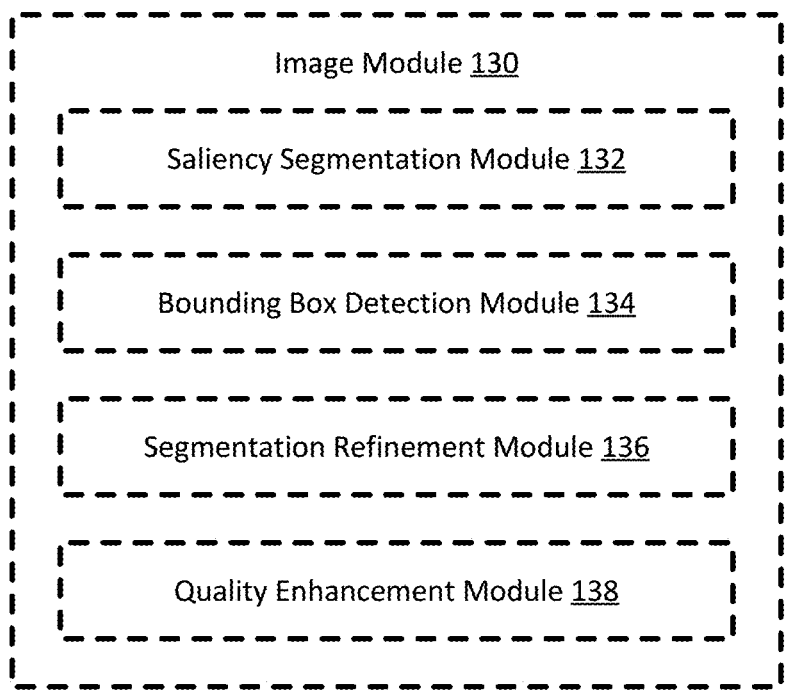
FIG. 2 schematically depicts an image module according to certain embodiments of the present disclosure.

The image module 130 is configured to, upon receiving the alternate images of the product, process each of the alternate images to obtain an enhanced image, and provide the enhanced image to the object module 140. In certain embodiments, the image module 130 may process the alternate images one by one sequentially, or in parallel. The processing of each of the alternate images includes segmenting the image to obtain segments in the images, defining a bounding box enclosing the segments, refining the segments, and enhance quality of the alternate image. As shown in FIG. 2, the image module 130 includes a saliency segmentation module 132, a bounding box detection module 134, a segmentation refinement module 136, and a quality enhancement module 138.

The saliency segmentation module 132 is configured to, for each of the received alternate images, perform saliency detection and segmentation to obtain a segmented image, and send the segmented image to the bounding box detection module 134. In certain embodiments, the saliency estimation is performed using static saliency, motion saliency, or objectness. In certain embodiments, the saliency estimation is performed using a neural-network-based approach, such as TASED-Net, STRA-Net, or STAViS. In certain embodiments, the saliency detection and segmentation is performed using a convolutional neural network (CNN) model that is finetuned using e-commerce images. In certain embodiments, the alternate image is a red-green-blue (RGB) image that has three-channels, and the saliency detection and segmentation adds a fourth channel to the alternate image. The added channel is also named a saliency map of the alternate image, and the value in the added channel for each pixel may be in the range of 0-1 or in a range of 0-255, or in any other arbitrary ranges. The higher the saliency value, the more attention the pixel gets. In certain embodiments, the four-channel alternate image may also be called a matting image, where the pixels having high saliency values are foreground pixels, and the pixels having low saliency values are background pixels. In certain embodiments, the cutoff for the foreground and background pixels may be about 0.5-0.9. In certain embodiments, the cutoff is set at 0.6, where the pixels having a saliency value equals to or greater than 0.6 is regarded as foreground pixels. In certain embodiments, the saliency channel or the saliency map may also be named a mask, where the foreground pixels and the background pixels are included in the mask, foreground pixel is 1 in the mask, and background pixel is 0 in the mask. The segmented image has the same size of the alternate image; each of the pixels has four channels, the three RGB channels have their respective color values, and the one saliency channel has its saliency value. In certain embodiments, the values in the three RGB channels of the background pixels are set as 255 such that the background pixels are white. However, the original alternate image is stored in the memory and the original RGB information of the alternate images are available for the modules in the product recommendation application 118 to retrieve from if needed.

Figure 3:
FIG. 3 schematically depicts an example of saliency segmentation according to certain embodiments of the present disclosure.

In certain embodiments, since one alternate image may have more than one objects, the saliency segmentation module 132 may find more than one segments. FIG. 3 schematically depicts saliency detection and segmentation of an alternate image according to certain embodiments of the present disclosure, where the left side is an alternate image before saliency processing, and the right side is the alternate image after saliency processing. As shown in the right side of FIG. 3, the two bottles have high saliency value and are regarded as foreground, and the rest of the alternate image has low saliency value and is regarded as background.

In certain embodiments, after saliency detection and segmentation of one of the alternate images, the saliency segmentation module 132 is further configured to process the next alternate image the same way. In certain embodiments, if there is no foreground pixels in the alternate image, the saliency segmentation module 132 would discard the alternate image and then process the next alternate image. After all the alternate images of the product are processed, the saliency segmentation module 132 may then processes the alternate images of the next product.

The bounding box module 134 is configured to, upon receiving the segmented image from the saliency segmentation module 132, create a contour for each of the segments, define a minimum bounding box enclosing the contours of the segments, and send the image with the bounding box to the segmentation refinement module 136. The bounding box includes pixels within the contours of the segments, and pixels within the bounding box but outside the contours.

Figure 4:
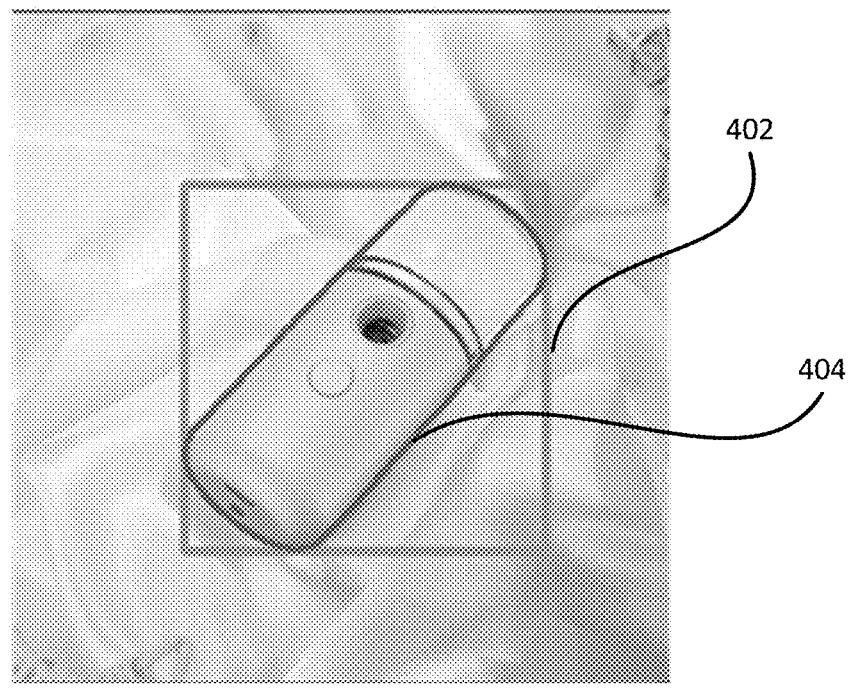
FIG. 4 schematically depicts contour creation and bounding box detection according to certain embodiments of the present disclosure.

FIG. 4 schematically depicts a result of bounding box detection according to certain embodiments of the present disclosure. As shown in FIG. 4, the bounding box 402 is defined to enclose the contour 404 of the bottle. Kindly note that when there are several objects in the alternate image, such as two bottles, the bounding box would enclose both the contours of the two bottles. In certain embodiments, the bounding box may also be defined to enclose only one object. Under this situation, there could be several bounding boxes for one alternate image if there are several objects in the image.

Figure 5:
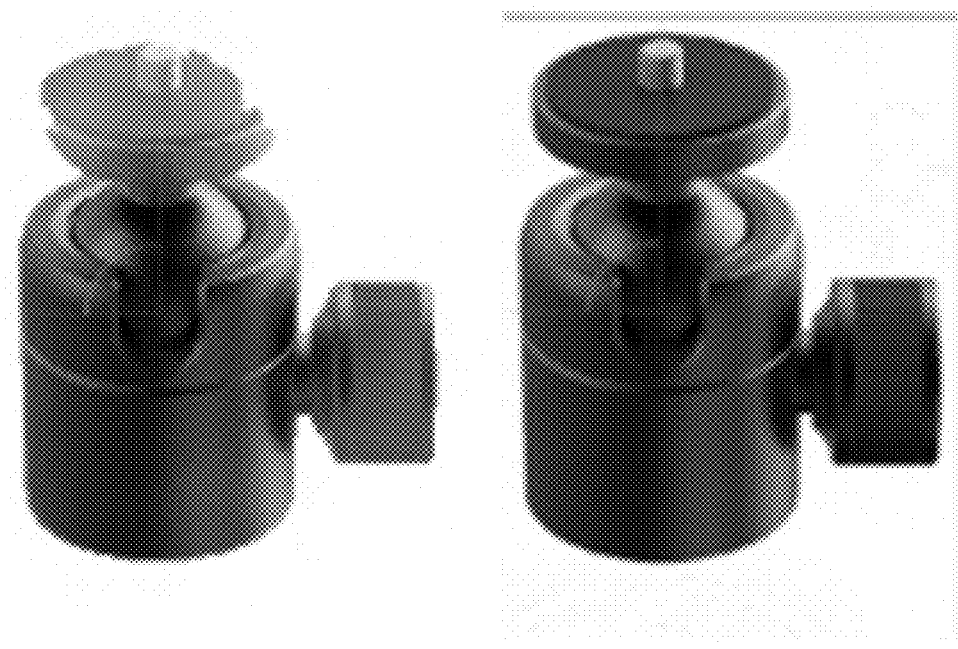
FIG. 5 schematically depicts refinement of a segment according to certain embodiments of the present disclosure.

The segmentation refinement module 136 is configured to, upon receiving the bounding box from the bounding box module 134, refine the one or several segments enclosed in the bounding box to obtain refined segments, and send the refined segment to the quality enhancement module 138. At this stage and before the processing by the segmentation refinement module 136, the segmented image has the same size as the alternate image, and each pixel has four channels. The bounding box is defined in the segmented image, and encloses the segments. Each segment has a contour. The pixels outside the bounding box are white background pixels, while the pixels inside the bounding box include both background pixels and foreground pixels. Sine the saliency detection may not be perfect, refinement can be performed to improve quality of the segments. In certain embodiments, the segmentation refinement module 136 is configured to define a segment bounding box for each of the segments, and perform segment refinement for each segment. (1) First, for each segment in its segment bounding box, the segmentation refinement module 136 performs outlier removal on the saliency map obtained from saliency detection module. In certain embodiments, the outlier removal is performed by erosion and dilation. (2) Second, the segmentation refinement module 136 performs normalization of the saliency map after outlier removal. In certain embodiments, the normalization is similar to L-infinity normalization. In certain embodiments, for the saliency map in the segment, the segmentation refinement module 136 performs Gaussian blur to the saliency map, rescales the saliency values in the range of 0-1.1, and then cut with 1. In other words, all the values in the range of 1-1.1 are now set as 1. (3) After normalization, the saliency values of the pixels in the segments are now in the range of 0-1. The segmentation refinement module 136 further applies an adaptive threshold to the normalized saliency values in the segment bounding box. In certain embodiments, each pixel has surrounding neighboring pixels, and mean saliency value or medium saliency value of the neighboring pixels are calculated. If the saliency value of the pixel is less than the mean or medium saliency value, the pixel is defined as a background pixel. If the saliency value of the pixel equals to or is greater than the mean or medium saliency value, the pixel is defined as a foreground pixel. (4) Furthermore, in order to reach sub-pixel accuracy and smoothness, pixels within the contour and pixels around contour are treated separately. Saliency pixels within the contour are forced as 1 (or 255, the maximum for 8-bits), saliency pixel around the edge are smoothly dropped to 0 to merge with the surroundings. (5) In each segment bounding box, there may be a small portion of one or more other segments in addition to the main segment in the segment bounding box. At the last refinement step, any other instances or segments intersected within the segment bounding boxes are wiped out to create a clean segmentation. In certain embodiments, the wipe-out is performed along the contour of the segment. Kindly note that by the refinement, the foreground and background pixels are further refined and may be different from the foreground and background pixels determined by the saliency segmentation module 132. When a pixel changes from a foreground pixel to a background pixel, its color is changed to white; and when a pixel changes from a background pixel to a foreground pixel, its color values can be retrieved from the original alternate image that may be stored in the memory 114 at this time. FIG. 5 schematically shows refinement of a segment according to certain embodiments of the present disclosure, where the left side is the segment obtained by the saliency segmentation module 132, and the right side is the segment after refinement by the segmentation refinement module 136. It can be seen from FIG. 5 that, after segment refinement, the edges of the segment are much clearer, and certain foreground portions of the segment are restored.

In certain embodiments, the bounding box detection and the segmentation refinement may be performed once or may be performed iteratively for a few rounds. In certain embodiments, the segmentation refinement is performed before the bounding box detection.

In certain embodiments, image erosion and dilation are performed within the bounding box received from the bounding box module 134 (large bounding box) to roughly remove the image noise. In certain embodiments, several segments (small bounding boxes) may be returned. In certain embodiments, there is only one segment in the image, and the large bounding box and the small bounding box are the same bounding box.

The quality enhancement module 138 is configured to, upon receiving the refined segments from the segmentation refinement module 136, improve image contrast, brightness, and sharpness at pixel level to obtain enhanced segments in their segment bounding boxes, and send the segment bounding boxes with the enhanced segments to the object module 140. The segment bounding box with the enhanced segments are also named enhanced segment bounding box. In certain embodiments, the enhancement is conducted for aesthetics purpose. In certain embodiments, the image enhancement includes image sharpening which improves high frequency image information and adaptive image histogram equalization which improves contrast.

Figure 6:
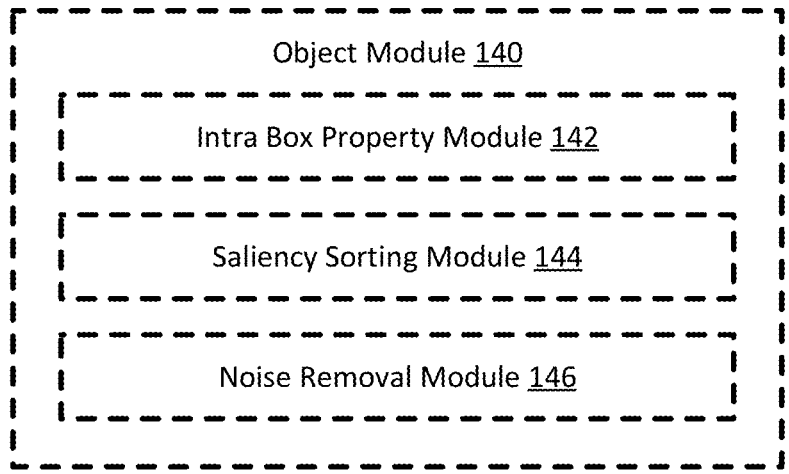
FIG. 6 schematically depicts an object module according to certain embodiments of the present disclosure.

The object module 140 is configured to, upon receiving the enhanced segment bounding boxes from the quality enhancement module 138, extract intra properties of the segments, sort the segments, filter the segments to obtain one segment, and send the enhanced segment bounding box with the enhanced segment to the feature module 150. As shown in FIG. 6, the object module 140 includes an intra box property module 142, a saliency sorting module 144, and a noise removal module 146.

The intra box property module 142 is configured to, upon receiving the enhanced segments, provide index of pixels for each of the enhanced segments, extract intra box properties of each of the enhanced segments in the segment bounding boxes, send the index of the pixels to the saliency sorting module 144, and send the intra box properties to the noise removal module 146. In certain embodiments, the intra box property module 142 may process the enhanced segments in parallel, or one by one sequentially. The number of enhanced segments may be, for example, one to eight according to the segmenting result. In certain embodiments, the number of enhanced segments is one to three. In certain embodiments, the intra box property includes image moment, central moment, aspect ratio, and optionally orientation angle. The image moment of one of the enhanced segment is defined as:

$$M_{ij} = \Sigma_x \Sigma_y x^i y^j I(x,y) \qquad (1),$$

where I(x, y) is the pixel intensity, and the zero order (0 order) or zero degree (0 degree) image moment ($M_{00}$) of the enhanced segment indicates the area of the enhanced segment in the bounding box. Here the intensity is the saliency intensity.

The central moment of the enhanced segment is defined as:

$$\mu_{pq} = \Sigma_x \Sigma_y (x-\bar{x})^p (y-\bar{y})^q f(x,y) \qquad (2),$$

where the centroid is:

$$\bar{x} = \frac{M_{10}}{M_{00}} \text{ and } \bar{y} = \frac{M_{01}}{M_{00}}.$$

In certain embodiments, the intra box property module 142 is configured to detect the aspect ratio of each segment bounding box that encloses corresponding one of the segments. The aspect ratio is defined as the ratio of the width to the height of the corresponding segment bounding box.

In certain embodiments, the intra box property module 142 may also be configured to detect orientation angle of the enhanced segment. In certain embodiments, the orientation angle is defined by forming an ellipse surrounding the segment, and determine the angle between the horizonal line and the major axis.

For each of the segments, the intra box property module 142 is further configured obtain coordinates of the pixels in the contour of the segment, prepare a pixel list having their coordinates, and provide the pixel lists of the segments or objects to the saliency sorting module 144. In certain embodiments, each of the pixels in the pixel list also has an identification to indicate which segment is belongs to, and the pixel list is also named the pixel index. In certain embodiments, the intra box property module 142 may not extract the image moment, the central moment, the orientation angle, and the aspect ratio, but only obtain and provide the pixel index to the saliency sorting module 144.

The saliency sorting module 144 is configured to, upon receiving the pixel index, calculate an average saliency value for the listed pixels of each enhanced segments based on the pixel index, sort the average saliency values for the segments, and provide the sorted segments to the noise removal module 146. In certain embodiments, the saliency values used for calculation are the values after normalization by the segment refinement module 136, but before the sub-pixel accuracy smoothness by the segment refinement module 136.

The noise removal module 146 is configured to, upon receiving the intra box properties from the intra box property module 142 and the sorted segments from the saliency sorting module 144, discard the segments that do not meet criteria of the intra box properties, select the segment that meets the intra box property criteria and is at the top of the sorted segments, and send the selected segment to the feature module 150.

In certain embodiments, the noise removal module 146 is configured to filter the segments using the image moment. The zero order image moment of the segment indicates the area of the segment, and the size of the zero order image moment is compared to the size of the whole alternate image, such as 500 pixels×500 pixels. When the ratio equals to or is greater than a 0 degree image moment threshold, the segment is kept, and when the ratio is less than the 0 degree image moment threshold, the segment is discarded. In certain embodiments, the 0 degree image moment threshold is in a range of 0.05-0.5. In certain embodiments, the 0 degree image moment threshold is in a range of 0.1-0.2. In certain embodiments, the 0 degree image moment threshold is 0.15, that is, the ratio of the area of the segment bounding box to the area of the alternate image equals to or is greater than 0.15. By this criterion, the segment that is too small is removed as noise.

In certain embodiments, the noise removal module 146 is configured to filter the segments using the centroid moment, where the centroid moment is the first degree of the image moment. The centroid moment of the segment indicates the center of the segment, the distance between the center of the segment and the center of the alternate image is calculated, and then the ratio between the distance and the length of the diagonal of the alternate image is calculated. When the ratio is less than a center deviation threshold, the segment is kept; and when the ratio equals to or is greater than the center deviation threshold, the segment is discarded. In certain embodiments, the center deviation threshold is in a range of 0.1-0.6. In certain embodiments, the center deviation threshold is in a range of 0.2-0.3. In certain embodiments, the center deviation threshold is 0.25, that is, the ratio of the distance between the center of the segment bounding box and the center of the alternate image should be less than 0.25 of the length of the diagonal of the alternate image. By this criterion, the segment that is far away from the center of the alternate image is removed as noise.

In certain embodiments, the noise removal module 146 is configured to filter the segments using the aspect ratio. The aspect ratio of the segment bounding box indicates the shape of the segment, which is preferably about 1:1. When the aspect ratio is within an aspect ratio range, the segment is kept; and when the ratio is out of the aspect ratio range, the segment is discarded. In certain embodiments, the aspect ratio range is 0.2(1:5)-5(5:1). In certain embodiments, the aspect ratio range is 0.5 (1:2)-2 (2:1). In certain embodiments, the aspect ratio range is 0.75 (3:4)-1.33 (4:3). By this criterion, the segment that is too slender or too stubby is removed as noise.

In certain embodiments, the noise removal module 146 is configured to filter the segments using the orientation angle. The orientation angle indicates whether the segment is tilted in the alternate image, and is preferably about 0 degree or about 90 degrees. When the orientation angle is within an orientation angle threshold from the 0 or 90 degree, the segment is kept; otherwise, the segment is discarded. In certain embodiments, the orientation threshold is in a range of −20-20 from 0 or 90. In certain embodiments, the orientation threshold is in a range of −10-10 from 0 or 90, that is, the orientation angle of the segment should be −10 to 10 degrees or 80-100 degrees. In certain embodiments, the filtering using the orientation angle is optional.

In certain embodiments, the noise removal module 146 is configured to filter the segments using the sorted segments. The segments are sorted by their average saliency values, and the noise removal module 146 is configured to select the segment having the highest average saliency value, and send the selected segment to the feature module 150. When a segment is removed based on the image moment, centroid moment, aspect ratio, or optionally the orientation angle, the noise removal module 146 is configured to discard that segment, and them select from the rest of the segments the one having the highest saliency value. In other words, the selected segment is the highest in the sorted segment list that meets the criteria for the image moment, centroid moment, aspect ratio, and optionally the orientation angle.

The steps of noise removal using the image moment, centroid moment, aspect ratio, the orientation angle, and the sorted saliency values may not be sequential as described above, and some of the noise removal step, such as the step based on the orientation angle, may not be necessary. In certain embodiments, the noise removal may be performed only using the aspect ratio and the sorted saliency values. After noise removal, there is only one segment left, with its segment bounding box (enhanced segment bounding box with the enhanced segment). In certain embodiments, when all the segments are discarded during the noise removal, the analysis for the alternate image is completed, the alternate image is discarded, and the product recommendation application 118 is configured to analyze the next alternate image.

Figure 7:
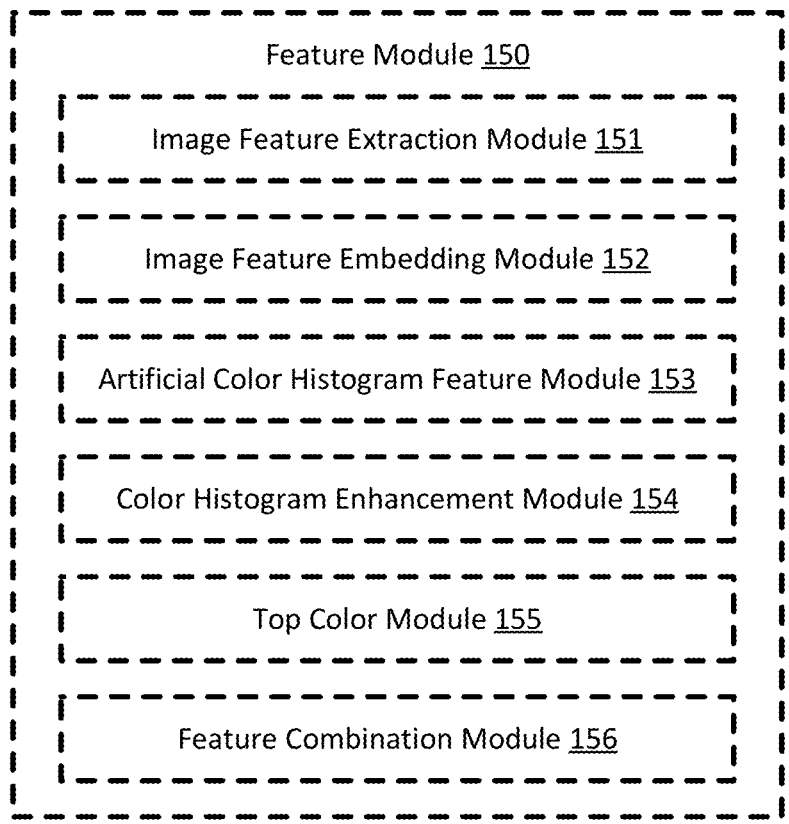
FIG. 7 schematically depicts a feature module according to certain embodiments of the present disclosure.

The feature module 150 is configured to, upon receiving the segment bounding box having the selected segment, extract image feature and top colors from the segment bounding box, and send the extracted image feature and the top colors to the comparison module 170. As shown in FIG. 7, the feature module 150 includes an image feature extraction module 151, an image feature embedding module 152, an artificial color histogram feature module 153, a color histogram enhancement module 154, a top color module 155, and a feature combination module 156.

Figure 8:
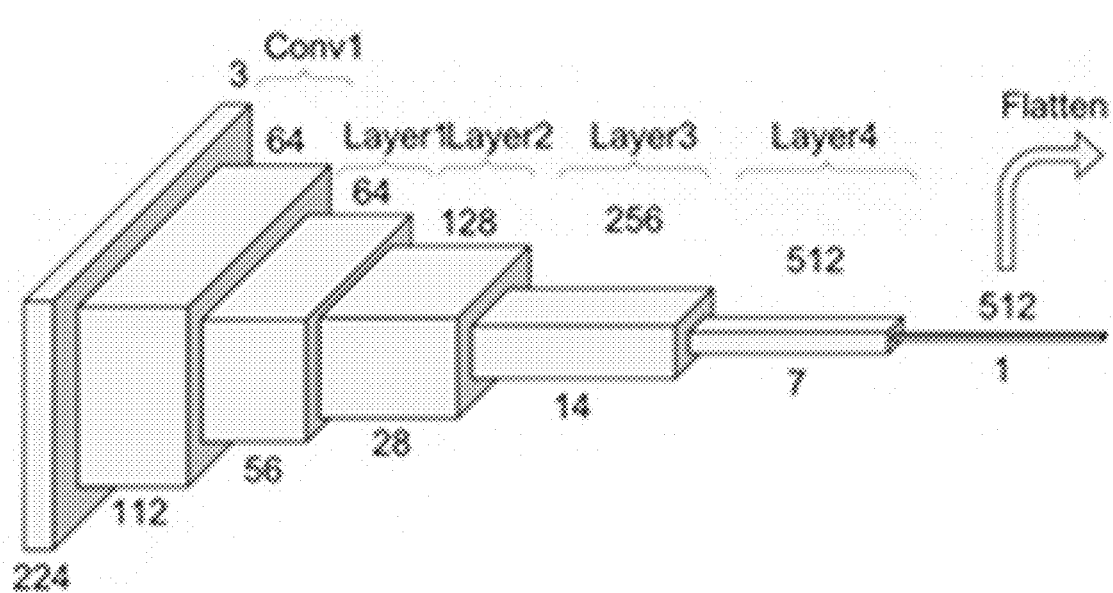
FIG. 8 schematically depicts a feature extraction model according to certain embodiments of the present disclosure.

The image feature extraction module 151 is configured to, upon receiving the segment bounding box containing the selected segment, extract image feature of the segment bounding box containing the selected segment, and send the image feature to the image feature embedding module 152. In certain embodiments, the image feature extraction is performed using a convolutional neural network (CNN). In certain embodiments, the CNN is ResNet pretrained in ImageNet. In certain embodiments, the CNN model used to extract image feature has a model structure as shown in FIG. 8, where the extracted image feature is expressed by a vector using 512 float values.

The image feature embedding module 152 is configured to, upon receiving the image feature from the image feature extraction module 151, embed the image feature to obtain embedded image feature, and send the embedded image feature to the feature combination module 156. In certain embodiments, the image feature embedding module 152 is a single layer of multi-layer perceptron (MLP) that zips the 512 float value vector into smaller numbers, such as a 128 float value vector. In certain embodiments, the image feature embedding module 152 is optional.

The artificial color histogram feature module 153 is configured to, upon receiving the segment bounding box containing the selected segment, collect color information within the segment, list the collected color information as a color histogram, and send the histogram to the color histogram enhancement module 154. A normalized color histogram feature can be invariant regardless of image scale, translation, rotation. It can be considered as color and texture signature of a given product.

The color histogram enhancement module 154 is configured to, upon receiving the color histogram of the segment, convert the color space of the color histogram from the RGB space to the hue, saturation, value (HSV) space to obtain an enhanced color histogram, and send the enhanced color histogram to the top color module 155. Color feature can be collected in different color spaces, from traditional RGB spaces to HSV spaces. Comparing with RGB spaces, HSV space is designed to approximate human perception and it is more robust against illumination interferences. In certain embodiments, the color histogram enhancement module 154 is further configured to truncate the color histogram to increase the robustness of such a feature. In certain embodiments, the conversion from the RGB space to the HSV space reduces differences from different illumination conditions.

The top color module 155 is configured to, upon receiving the enhanced color histogram, apply a k-means clustering algorithm to the enhanced color histogram feature to obtain major colors selected via the k-means, and send the k major colors to the feature combination module 156. In certain embodiments, the number k is set at one to five. In certain embodiments, the number k is set at two or three.

The feature combination module 156 is configured to, upon receiving the embedded color feature from the image feature embedding module 152 and the major colors from the top color module 155, combine the embedded color feature and the major colors to form the combined image feature, and send the combined image feature to the comparison module 170. The combined image feature may be in a form of a vector having multiple dimensions, and the dimensions store values representing the embedded color feature and the major colors.

The text and main image module 160 is configured to, upon receiving the text and the main image of the product from the product retriever 120, embed the text to obtain a textual feature of the product, embed the main image of the product to obtain a main image feature, and send the textual feature and the main image feature to the comparison module 170. In certain embodiments, the textual feature is obtained using BERT, Word2Vec, GloVe, FastTex, or other type of pretrained word embedding models, and the textual feature is in a form of a vector. In certain embodiments, the embedding of the main image to obtain the main image feature is performed similarly to the processing of the alternate images, and the result of the embedding includes the general image feature and the major colors.

The comparison module 170 is configured to, upon receiving the combined image feature of the alternate image (the enhanced segment bounding box containing the selected enhanced segment), the textual feature of the product, and the image feature of the main image, match the combined image feature to the textual feature, match the combined image feature to the image feature of the main image, determine if a product is a valid product for recommendation, and send the valid product to the recommendation module 180.

Figure 9:
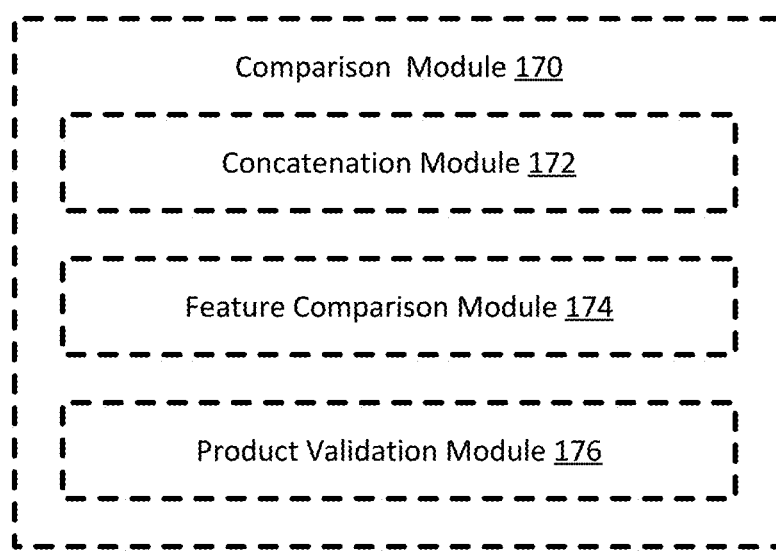
FIG. 9 schematically depicts a comparison module according to certain embodiments of the present disclosure.

The concatenation module 172 is configured to perform weighted concatenation of the image feature from the feature combination module 156 and the textual feature from the text and main image module 160 to obtain a concatenated vector, subject the concatenated vector to classification/regress layers (or a transformer) to obtain relevance between the image feature of the alternate image of the product and the textual feature of the product, and send the alternate image-text relevance to the product validation module 176. In certain embodiments, in order to compare the image feature and textual feature, the image feature is embedded by mimicking the embedding of text. For example, the alternate image may be split into small grids, the small grids are aligned sequentially, each grid is subjected to a CNN model to obtain its embedding, positions of the girds in the sequence of grids are embedded, and the embedding of the sequential grids have similar format as the sequence of words in a sentence. In certain embodiments, as shown in FIG. 9, the comparison module 170 may include a concatenation module 172, a feature comparison module 174, and a product validation module 176.

The feature comparison module 174 is configured to, upon receiving the image feature of the alternate image from the feature combination module 156 and the image feature of the main image from the text and main image module 160, compare the image feature of the alternate image to the image feature of the main image to obtain relevance between the alternate image and the main image, and send the matching result to the product validation module 176. In certain embodiments, the feature comparison module 174 is configured to use at least one of the following feature comparison methods to determine the relevance between the alternate image (segment bounding box containing the selected segment) and the main image, such as cosine similarity, correlation, histogram intersection and Kullback-Leibler divergence.

In certain embodiments, cosine similarity score is calculated for the comparison between two image features:

$$\text{Similarity} = \cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}}. \quad (3)$$

In certain embodiments, correlation score is calculated for the comparison between two image features:

$$d(H_1, H_2) = \frac{\sum_I (H_1(I) - \overline{H_1})(H_2(I) - \overline{H_2})}{\sqrt{\sum_I (H_1(I) - \overline{H_1})^2 \sum_I (H_2(I) - \overline{H_2})^2}}, \quad (4)$$

where: $\overline{H_k} = \frac{1}{N}\sum_j H_k(J)$.

In certain embodiments, intersection score is calculated for the comparison between two image features:

$$d(H_1, H_2) = \Sigma_I \min(H_1(I), H_2(I)) \quad (5).$$

In certain embodiments, KL divergency is calculated for the comparison between two image features:

$$d(H_1, H_2) = \sum_I H_1(I) \log\left(\frac{H_1(I)}{H_2(I)}\right). \quad (6)$$

In certain embodiments, only cosine similarity score is used for the comparison.

The product validation module 176 is configured to, upon receiving the alternate image-text relevance from the concatenation module 172 and the alternate image-main image relevance from the feature comparison module 174, determine if the alternate image is a qualified alternate image, determine if the other alternate images are qualified alternate images, and if the number of qualified alternate images equals to or is greater than a threshold number, select the threshold number of qualified alternate images, and send the product with the text, the main image, and the threshold number of qualified alternate images to the recommendation module 180.

In certain embodiments, the product validation module 176 is configured to determine that the alternate image is the qualified alternate image when there is relevance both between the alternate image and the text, and between the alternate image and the main image. The relevance between the alternate image and the text, and the relevance between the alternate image and the main image may be in a form of a classification with the result Yes or No, or a relevance value. When the relevance is indicated by a relevance value, the relevance may be determined by comparing the relevance value to a relevance threshold. In certain embodiments, the threshold may be in a range of 0.5-0.9. In certain embodiments, the relevance threshold is 0.6-0.8. In certain embodiments, the relevance threshold is 0.7. In certain embodiments, the product validation module 176 is configured to place the enhanced segment bounding box to the size of the original alternate image to obtain the final alternate image, where white background pixels may need to be added. In certain embodiments, since the main image generally has a high quality, there may be no need to enhance the main image, and the main image from the product database 190 can be used directly in the recommended product.

After determining whether one alternate image is a qualified alternate image, the product validation module 176 is further configured to instruct the image module 130 to process the next alternate image for the product. The product may have, for example, about seven or eight alternate images. The product validation module 176 is further configured to count the number of qualified alternate images, and if the number equals to or is greater than the threshold number, select the threshold number of qualified alternate images that having the highest average saliency value, and send the product with text, main image and the threshold number of alternate images to the recommendation module 180. The threshold number may be in the range of 1-5. In certain embodiments, the threshold number is 2. In certain embodiments, the size of the alternate image and the size of the main image is the same; in each of the alternate images, the segment is the enhanced segment, and the background is white.

The recommendation module 180 is configured to, upon receiving the product having the text, the main image, and the threshold number of alternate images, define the product as a recommendation product, and recommend the recommendation product to customers or selected customers. In certain embodiments, the recommendation is performed after the product recommendation application 118 processed all the products from the product database 190. In certain embodiments, the recommendation module 180 is configured to store the recommendation product in the recommendation product database 192, and retrieve the recommendation products when recommendation to the customers is needed. In certain embodiments, the product recommendation application 118 may perform the process in a predetermined time interval on the new products in the product database 190 or the products in the product database 190 that have updated main image or updated alternate images, so as to update the recommendation product database 192 regularly. The predetermined time interval can be, for example, every 24 hours, every week, or every month.

The user interface 182 is configured to communicate with an administrator of the product recommendation application 118, for example through a graphic user interface. The administrator can adjust parameters of the product recommendation application 118, or communicate with other applications to provide the recommended products to customers.

In certain embodiments, the product search application 118 may also include a scheduler, to coordinate data flow of text and image information of products. The coordination may be performed by loading product images to the memory, and calling different functional modules of the product recommendation application 118 to process the images step by step.

Figure 10A:
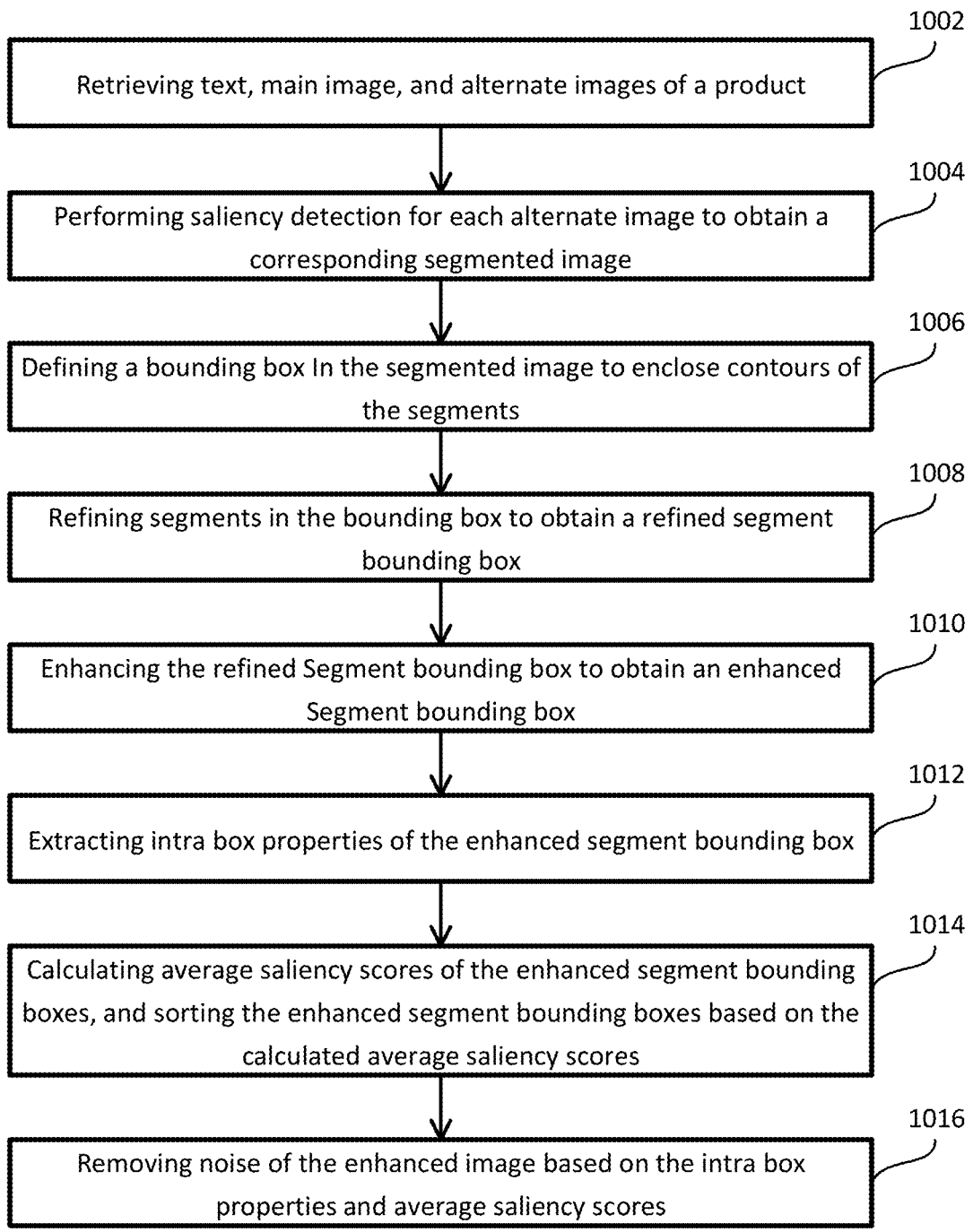
FIG. 10A and FIG. 10B schematically depict a method for product recommendation according to certain embodiments of the present disclosure.
Figure 10B:
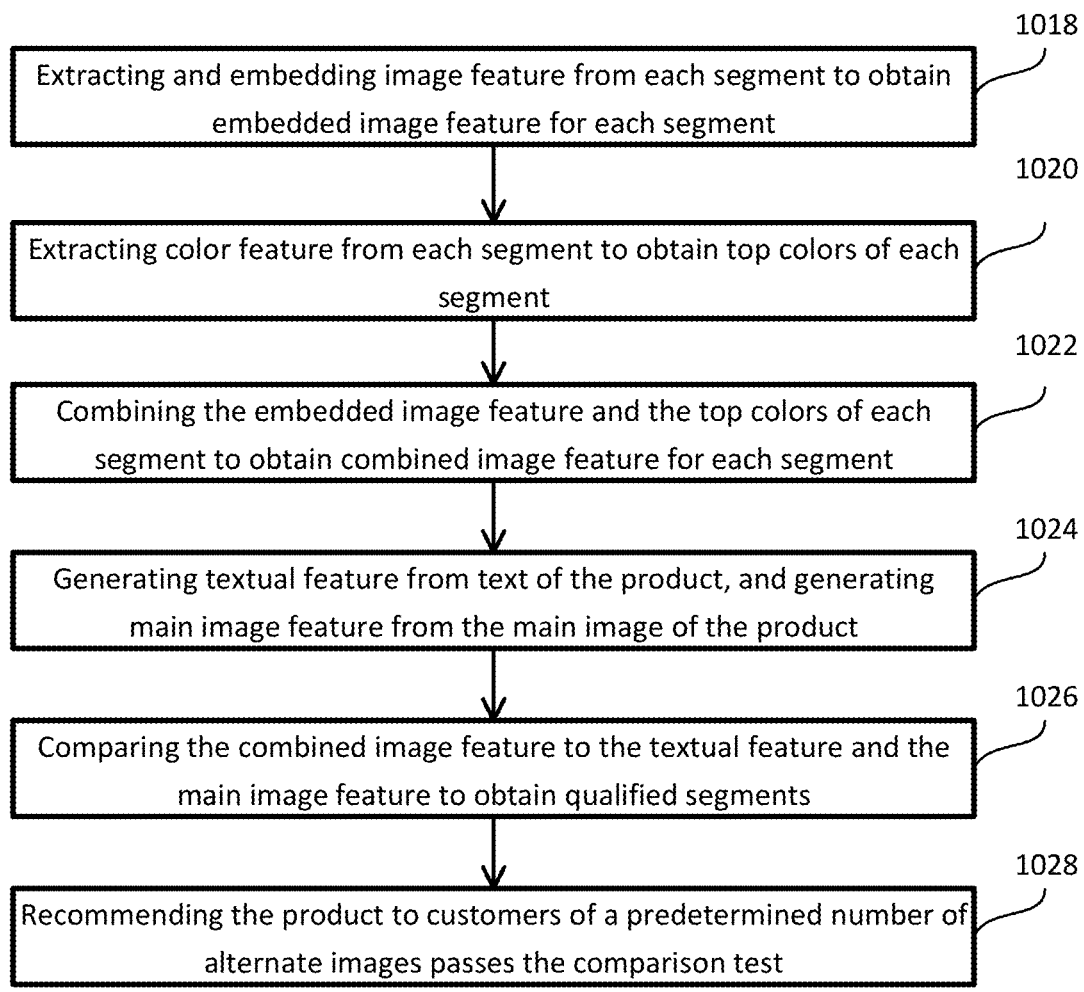

In certain aspects, the present disclosure relates to a method for product recommendation. FIG. 10 schematically depicts a method for product recommendation according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 10.

At procedure 1002, the product retriever 120 retrieves information of a product from the product database 190. The information of the product includes text such as title and description, main image, and multiple alternate images. The product retriever 120 sends the alternate images to the saliency segmentation module 132, and sends the text and the main image to the text and main image module 160.

At procedure 1004, for each of the alternate images, the saliency segmentation module 132 performs saliency detection and segmentation to obtain a segmented image, and sends the segmented image to the bounding box detection module 134. In certain embodiments, the saliency detection and segmentation is performed using a CNN finetuned in e-commerce images. As a result, in addition to the three RGB channels of the alternate image, the segmented image further includes a fourth channel storing the saliency values of the pixels. The saliency value for each pixel in the fourth channel may be in a range of 0-1. The pixels having saliency values that equal to or are greater than a threshold value are defined as foreground pixels, the pixels having saliency values that are less than the threshold value are defined as background values. In certain embodiments, the threshold is set at about 0.6. In certain embodiments, the background pixels are given the color white. In certain embodiments, the foreground may include one or multiple segments. Each segment may correspond to an object in the alternate image, and each segment may be named an instance.

At procedure 1006, upon receiving the segmented image, the bounding box detection module 134 creates a contour for each of the segments, defines a minimum bounding box enclosing the contours of the segments, and sends the image having the bounding box and the segment contours to the segmentation refinement module 136.

At procedure 1008, upon receiving the bounding box with the enclosed foreground segments, the segmentation refinement module 136 refines the segments, and sends the refined segment bounding box with the refined segments to the quality enhancement module 138. Specifically, the segmentation refinement module 136 defines a small segment bounding box for each segment, and then refines the segment in the small segment bounding box. In certain embodiments, the segment refinement includes outlier removal of the segment contour, normalization of the saliency map of the segment, application of an adaptive threshold, sub-pixel smoothness, and wiping of segment intersections. The result is one or several small segment bounding boxes, each segment bounding box enclosing corresponding one of the refined segments. During refinement, some pixels may change from background pixels to foreground pixels, and their RGB values are retrieved from the original alternate image that may be located in the memory 114; some pixels may change from foreground pixels to background pixels and are given the color white.

At procedure 1010, upon receiving the refined segment bounding boxes with the refined segments, the quality enhancement module 138 improves the quality of the refined segments to obtain an enhanced segment bounding boxes with enhanced segments, and sends the enhanced segment bounding boxes to the intra box property module 142 of the object module 140. The enhancement may include image sharpening and adaptive image histogram equalization.

At procedure 1012, upon receiving the enhanced segments, the intra box property module 142 extracts pixel index for the enhanced segments, extracts intra box properties of the enhanced segments, sends the pixel index to the saliency sorting module 144, and sends the extracted intra box properties to the noise removal module 146. The extracted intra box properties may include, for example, image moment, center moment, and perspective ratio, and optionally orientation angle.

At procedure 1014, upon receiving the pixel index, the saliency sorting module 144 sorts the enhanced segments based on their average saliency values, and sends the sorted segments to the noise removal module 146.

At procedure 1016, upon receiving the intra box properties of the segments and the sorted segments, the noise removal module 146 removes noises, selects one of the enhanced segments, and sends the selected segments to the feature module 150. In certain embodiments, the noise removal module 146 first filters the segments using the image moment to discard segments having too small image moment, then filters the kept segments using the centroid moment to discard segments that are located far from the center of the alternate image, then filters the kept segments using the aspect ratio to discard segments having great aspect ratio, then filters the kept segments using the orientation angle to discard segments that are tilted too much, and finally selects one of the kept segments that has the highest average saliency value. In certain embodiments, the filter based on the orientation angle is optional and can be removed. In certain embodiments, the noise removal is performed only using the aspect ratio and the sorted average saliency value.

At procedure 1018, upon receiving the segment bounding box containing the selected segment from the noise removal module 146, the image feature extraction module 151 extract image feature from the enhanced segment bounding box with the enhanced segment, and sends the extracted image feature to the image feature embedding module 152; and the image feature embedding module 152 embeds the extracted image feature to obtain embedded image feature, and sends the embedding image feature to the feature combination module 156.

At procedure 1020, upon receiving the segmented bounding box containing the selected segment from the noise removal module 146, the artificial color histogram feature module 153 generates a color histogram for the segment and sends the color histogram to the color histogram enhancing module 154; the color enhancing module 154 converts the color histogram from RGB space to HSV space to obtain an enhanced color histogram, and sends the enhanced color histogram to the top color module 155; the top color module 155 determines a number of top colors from the enhanced histogram, and sends the top colors to the feature combination module 156. The number of top colors may be in the range of 1-5. In certain embodiments, the number of top colors is 3.

At procedure 1022, the feature combination module 156 combines the embedded image feature and the top colors of the segment to obtain a combined image feature, and sends the combined image feature to the comparison module 170. In certain embodiments, the combined image feature is in a form of a vector.

At procedure 1024, upon receiving the text and the man image of the product from the product retriever 120, the text and main image module 160 embeds the text to obtain a textual feature of the product, embeds the main image of the product to obtain a main image feature, and sends the textual feature an main image feature to the comparison module 170. In certain embodiments, the main image is used directly for image embedding using the feature module 150. In certain embodiments, the main image may also be processed in advance by the image module 130, the object module 140 before being embedded by the feature module 150.

At procedure 1026, upon receiving the combined image feature of the alternate image, the textual feature, and the main image feature, the comparison module 170 compares the combined image feature to the textual feature and the main image feature, respectively, and if the combined image feature matches both the textual feature and the main image feature, determines that the alternate image is a qualified alternate image. The above procedures 1004-1024 can be repeated for other alternate images. If there are threshold number of alternate images or more that are qualified alternate images, the comparison module 170 selects the threshold number of alternate images having the highest average saliency values, and sends the text, the main image (or the enhanced main image), and the threshold number of enhanced alternate images to the recommendation module 180. The threshold number may be, for example, two.

At procedure 1028, upon receiving the products from the comparison module 170, the recommendation module 180 recommends the products to customers or selected customers. Each of the recommended products includes its text, its main image (or the enhanced main image), and the threshold number of enhanced alternate images.

Figure 11:
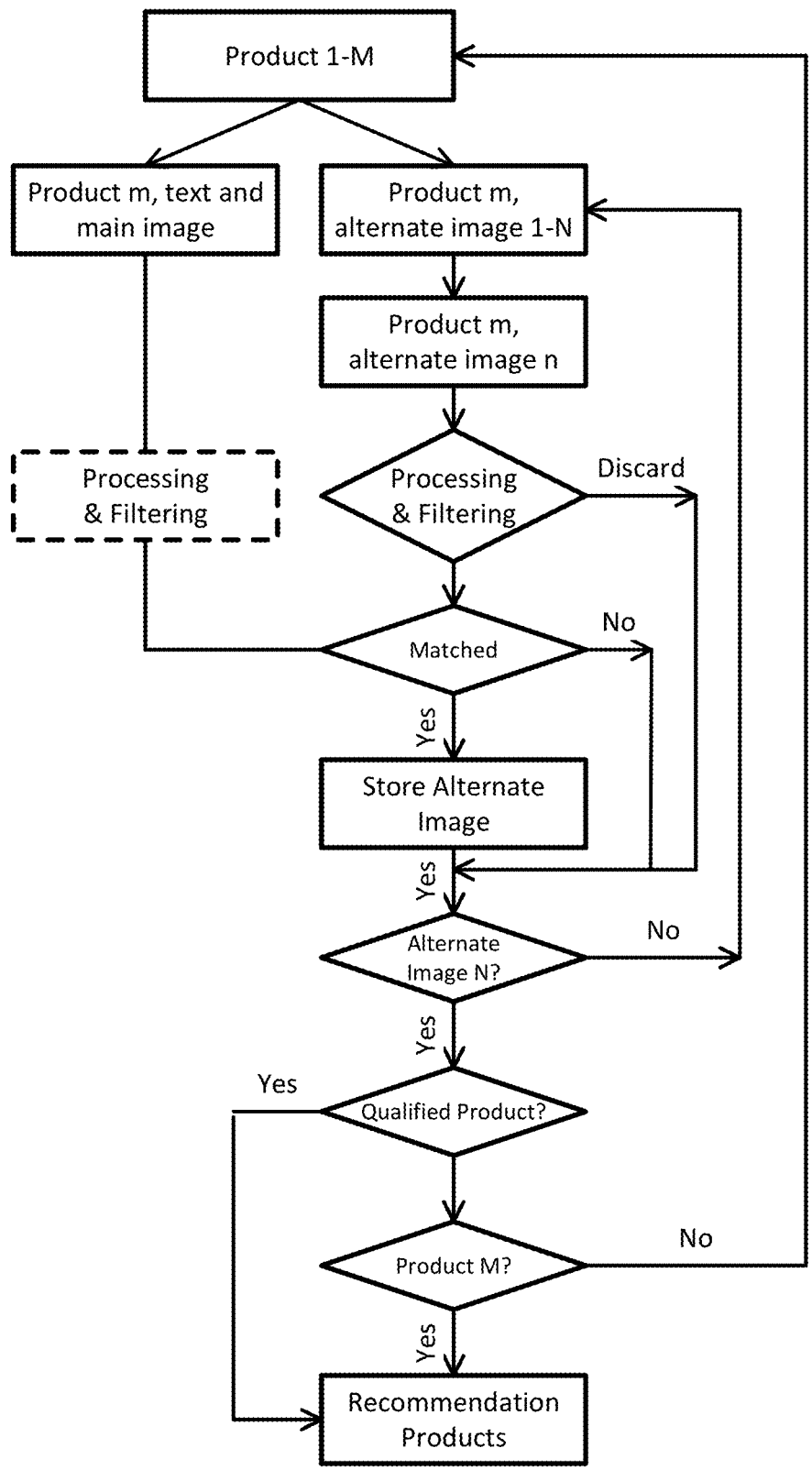
FIG. 11 schematically depicts a flow chart of a product recommendation system according to certain embodiments of the present disclosure.
Figure 12:
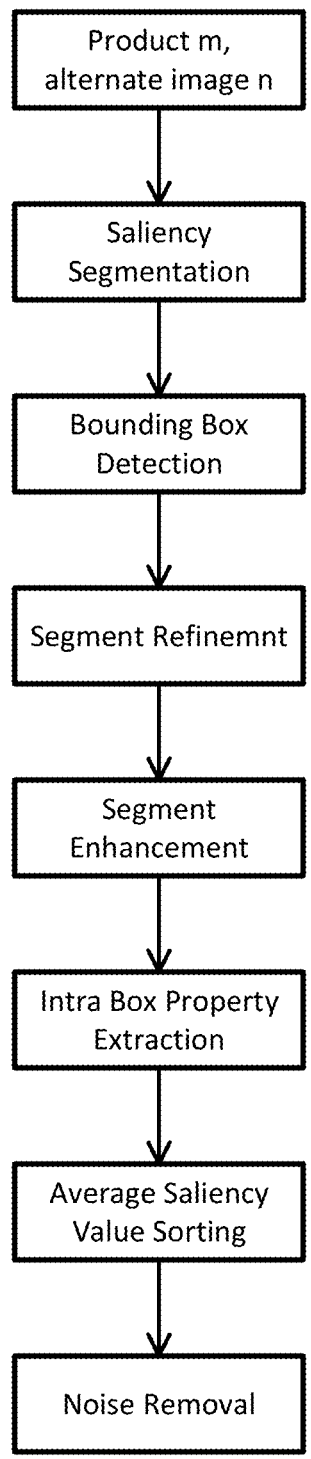
FIG. 12 schematically depicts processing and filtering of an alternate image according to certain embodiments of the present disclosure.

FIG. 11 schematically depicts a flow chart of a product recommendation system according to certain embodiments of the present disclosure. As shown in FIG. 11, M products are subjected to a recommendation process. For the product m having N alternate images, each alternate image n is processed and filtered, and is matched to the text and main image of the product m. If the alternate image m matches the text and matches the main image, the alternate image is stored, and the process continues to process the next alternate image. After all the alternate images are processed, the product is determined as a qualified product if there are threshold number of alternate images available for the product, and the product is determined as a recommendation product. After processing all the M products, the obtained recommendation products can be recommended to the customers. FIG. 12 schematically depicts processing and filtering of an alternate image according to certain embodiments of the present disclosure. As shown in FIG. 12, the procedures of saliency segmentation, bounding box detection, segment refinement, segment enhancement, intra box property extraction, average saliency value sorting, and noise removal may be performed sequentially for each of the alternate images.

In certain aspects, the present disclosure relates to a non-transitory computer readable medium storing computer executable code. The code, when executed at a processer of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, the present disclosure created a whole machine vision processing pipeline to segment, extract feature, enhance, and do cross-domain validation for product photograph. There is no existing solutions handle this task entirely. General speaking there are four modules in this disclosure: (1) the image block, (2) the object block, (3) the feature block and (4) the matching block.

The image block deals with accurate image segmentation and quality improvement. This module cuts the image into several object instances, and treats each objector according to saliency priority.

The object block analyzes each segmented image region and extract the followings: (a) geometric features: centroid, bounding box, perspective ratio, area and corresponding locations within the image, (b) general image feature: resnet backbone feature extraction, (c) color distribution feature: salience analysis for noise removal and color histogram features for texture information.

The feature block does post processing for all the image features: (a) embedding for the general image features; and (b) color space transformation, normalization, k-means, truncation of the color distribution feature.

The matching block embeds all difference features together and evaluates the relevance among these. Images with low feature relevance score or containing conflict information are automatically removed.

Certain embodiments of the present disclosure, among other things, have the following beneficial advantages. (1) The saliency detection of the image is accurate, for example, by refining the segment iteratively. (2) Image feature extraction can be performed on the segment level. (3) The alternate images are enhanced using variable of method to obtain high quality alternate images. (4) Comparisons between image and text are made available.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computer-implemented method for recommending a product, comprising:
    providing product information of the product, wherein the product information comprises a product description, a main image, and a plurality of alternate images;
    extracting textual feature from the product description, and extracting main image feature from the main image;
    for each of the plurality of alternate images: extracting image feature from the alternate image, matching the image feature to the textual feature and the main image feature, and determining the alternate image as a qualified alternate image if the image feature matches the textual feature and the main image feature; and
    when a number of the qualified alternate images equals to or is greater than a threshold number: recommending the product with updated product information to customers, wherein the updated product information comprises the product description, the main image, and the threshold number of the qualified alternate images; and
    wherein the extracting the image feature from the alternate image comprises:
        performing saliency segmentation on the alternate image to obtain a mask for the alternate image, the mask comprising a segment and background, saliency values of the segment are greater than saliency values of the background;
        defining a segment bounding box enclosing the segment; and
        extracting the image feature from the segment bounding box.

2. The method of claim 1, further comprising, before extracting the image feature from the segment bounding box:
    refining the segment in the segment bounding box to obtain refined segment bounding box; and
    enhancing image quality of the refined segment bounding box to obtain enhanced segment bounding box,
    wherein the step of extracting image feature from the segment bounding box is performed using the enhanced segment bounding box, and the qualified alternate image is derived from the enhanced segment bounding box.

3. The method of claim 2, wherein the step of refining the segment in the segment bounding box comprises:
    removing outlier pixels from the segment by erosion and dilation;
    normalizing saliency values of the pixels of the segment to obtain normalized saliency values in a range of 0 to 1;
    applying an adaptive threshold to the normalized saliency values to define background pixels and foreground pixels;
    forcing saliency values for pixels in contour of the segment to 1; and
    dropping saliency values around edge of the contour smoothly to 0.

4. The method of claim 3, wherein the step of enhancing image quality of the refined segment bounding box comprises performing image sharpening and adaptive image histogram equalization on the refined segment bounding box.

5. The method of claim 1, wherein the segment of the mask comprises a plurality of segments, and the method further comprises, before extracting the image feature from the segment bounding box:
    calculating a 0 degree image moment for each of the plurality of segment bounding boxes;
    deleting one of the plurality of segment bounding boxes when the 0 degree image moment of the one of the plurality of segment bounding boxes is less than a 0 degree image moment threshold, so as to obtain retained segment bounding boxes; and
    calculating an average saliency value for each of the retained segment bounding boxes, and selecting one of the retained segment bounding boxes having the highest average saliency value as the segment bounding box for extracting the image feature.

6. The method of claim 5, wherein the 0 degree image moment threshold is 10% of an area of the alternate image.

7. The method of claim 1, wherein the step of extracting the image feature from the segment bounding box is performed by:
    extracting general image feature from the segment bounding box using a convolutional network;
    extracting color histogram from the segment bounding box;

extracting top-k colors from the color histogram; and
combining the genera image feature and the top-k colors to form the image feature.

8. The method of claim 7, wherein the step of extracting top-k colors is performed using k-means clustering, and k is three.

9. The method of claim 1, wherein the step of determining the alternate image as a qualified alternate image comprises:
matching the image feature to the textual feature using a transformer; and
matching the image feature to the main image feature using cosine similarity.

10. The method of claim 1, wherein the threshold number is two.

11. A system for recommending a product, wherein the system comprises a computing device, the computing device comprises a processor and a storage device storing computer executable code, and the computer executable code, when executed at the processor, is configured to:
provide product information of the product, wherein the product information comprising a product description, a main image, and a plurality of alternate images;
extract textual feature from the product description, and extract main image feature from the main image;
for each of the plurality of alternate images: extract image feature from the alternate image, match the image feature to the textual feature and the main image feature; and determine the alternate image as a qualified alternate image if the image feature matches the textual feature and the main image feature; and
when a number of the qualified alternate images equals to or is greater than a threshold number: recommend the product with updated product information to customers, wherein the updated product information comprises the product description, the main image, and the threshold number of the qualified alternate images; and
wherein the computer executable code is configured to extract the image feature by:
performing saliency segmentation on the alternate image to obtain a mask for the alternate image, the mask comprising a segment and background, saliency values of the segment are greater than saliency values of the background;
defining a segment bounding box enclosing the segment; and
extracting the image feature from the segment bounding box.

12. The system of claim 11, wherein the computer executable code is further configured to, before extracting the image feature from the segment bounding box:
refine the segment in the segment bounding box to obtain refined segment bounding box; and
enhance image quality of the refined segment bounding box to obtain enhanced segment bounding box,
wherein the computer executable code is configured to extract the image feature from the enhanced segment bounding box, and the qualified alternate image is derived from the enhanced segment bounding box.

13. The system of claim 12, wherein the computer executable code is configured to refine the segment in the segment bounding box by:
removing outlier pixels from the segment by erosion and dilation;
normalizing saliency values of the pixels of the segment to obtain normalized saliency values in a range of 0 to 1;
applying adaptive threshold to the normalized saliency values to define background and foreground pixels;
forcing saliency values for pixels in contour of the segment to 1; and
dropping saliency values around edge of the contour smoothly to 0.

14. The system of claim 13, wherein the compute executable code is configured to enhance image quality of the refined segment bounding box by: performing image sharpening and adaptive image histogram equalization on the refined segment bounding box.

15. The system of claim 11, wherein the segment of the alternate image comprises a plurality of segments, and the computer executable code is further configured to:
calculate a 0 degree image moment for each of the plurality of segment bounding boxes;
delete one of the plurality of segment bounding boxes when the 0 degree image moment of the one of the plurality of segment bounding boxes is less than a 0 degree image moment threshold, so as to obtain retained segment bounding boxes; and
calculate an average saliency value for each of the retained segment bounding boxes, and select one of the retained segment bounding boxes having the highest average saliency value as the segment bounding box for extracting the image feature,
wherein the 0 degree image moment threshold is 10% of an area of the alternate image.

16. The system of claim 11, wherein the computer executable code is configured to extract image feature from the segment bounding box by:
extracting general image feature from the segment bounding box using a convolutional network;
extracting color histogram from the segment bounding box;
extracting top-k colors from the color histogram; and
combining the genera image feature and the top-k colors to form the image feature.

17. The system of claim 11, wherein the computer executable code is configured to determine the alternate image as a qualified alternate image by:
matching the image feature to the texture feature using a transformer; and
matching the image feature to the main image feature using cosine similarity.

18. A non-transitory computer readable medium storing computer executable code, wherein the computer executable code, when executed at a processor of a computing device, is configured to:
provide product information of the product, wherein the product information comprises a product description, a main image, and a plurality of alternate images;
extract textual feature from the product description, and extract main image feature from the main image;
for each of the plurality of alternate images: extract image feature from the alternate image, match the image feature to the textual feature and the main image feature, and determine the alternate image as a qualified alternate image if the image feature matches the textual feature and the main image feature; and
when a number of the qualified alternate images equals to or is greater than a threshold number: recommend the product with updated product information to customers, wherein the updated product information comprises the product description, the main image, and the threshold number of the qualified alternate images; and wherein the computer executable code, when executed at a processor of a computing device, is configured to extract the image feature by:

performing saliency segmentation on the alternate image to obtain a mask for the alternate image, the mask comprising a segment and background, saliency values of the segment are greater than saliency values of the background;

defining a segment bounding box enclosing the segment; and extracting the image feature from the segment bounding box.

\* \* \* \* \*